United States Patent [19]

Taguchi et al.

[11] Patent Number: 5,701,534
[45] Date of Patent: Dec. 23, 1997

[54] SEAL APPARATUS OF FINDER

[75] Inventors: Ichiro Taguchi; Masahiro Inazuka, both of Tokyo, Japan

[73] Assignee: Asahi Kogaku Kogyo Kabushiki Kaisha, Tokyo, Japan

[21] Appl. No.: 377,332

[22] Filed: Jan. 24, 1995

[30] Foreign Application Priority Data

Jan. 25, 1994 [JP] Japan .................. 6-000192 U

[51] Int. Cl.⁶ ..................... G03B 13/02; G03B 13/08
[52] U.S. Cl. ................. 396/373; 396/386; 396/384
[58] Field of Search ............... 354/219, 224, 354/225; 396/373, 374, 385, 386, 384; 348/333

[56] References Cited

U.S. PATENT DOCUMENTS

| | | | |
|---|---|---|---|
| 4,164,369 | 8/1979 | Urano et al. | 354/219 |
| 4,209,247 | 6/1980 | Urano et al. | 354/219 |
| 4,299,462 | 11/1981 | Suzuki et al. | 354/53 |
| 4,452,522 | 6/1984 | Murakami et al. | 354/289.12 |
| 4,974,014 | 11/1990 | Teramoto et al. | 354/478 |
| 5,130,855 | 7/1992 | Mukai et al. | 359/836 |
| 5,250,969 | 10/1993 | Abe et al. | 354/219 |
| 5,406,399 | 4/1995 | Koike | 359/83 |
| 5,436,635 | 7/1995 | Takahara et al. | 345/92 |
| 5,467,204 | 11/1995 | Hatano et al. | 358/482 |
| 5,537,184 | 7/1996 | Hasushita et al. | 354/471 |

*Primary Examiner*—Safet Metjahic
*Assistant Examiner*—Christopher E. Mahoney
*Attorney, Agent, or Firm*—Greenblum & Bernstein P.L.C.

[57] ABSTRACT

A seal apparatus for a finder having a liquid crystal display is provided with a liquid crystal body and a pair of polarizing plates. One of the polarizing plates is secured to an entrance opening or emission opening of a finder body to close the finder body.

9 Claims, 1 Drawing Sheet

SEAL APPARATUS OF FINDER

BACKGROUND OF THE INVENTION

1. Field of the Invention

The present invention relates to a finder having a liquid crystal display, and more precisely, it relates to a seal apparatus which seals a part or entirety of a finder optical system.

2. Description of the Related Art

In a real image type view finder to be incorporated in a lens shutter type camera, etc., an optical element, such as a transmission type liquid crystal display (LCD) is provided on a focal plane of an objective lens group or in the vicinity thereof, and a condenser lens is provided in front of the LCD. In a real image type view finder, if foreign matter such as dust contacts a first surface or a second surface of the condenser lens, or the LCD, the foreign matter which is in the vicinity of the focal plane can be viewed in a focused state on an object image by a photographer. Hence, the foreign matter obstructs the object image.

A solution to this problem is to partially isolate the light path of the finder including the optical element from its surroundings. For instance, entrance and emission openings of a finder body are closed or sealed by separate transparent covers.

However, in this configuration two transparent covers are needed, hence the number of the components of the seal apparatus increases. Moreover, the transparent cover not only complicates the assembly, but also increases the manufacturing cost.

SUMMARY OF THE INVENTION

The primary object of the present invention is to provide a simple and inexpensive seal apparatus of fewer components, for a view finder having a liquid crystal display (LCD).

If the polarizing plate of the LCD is located relatively far from the liquid crystal plate, there is no or little adverse influence on the optical function of the LCD. Namely, it has been found that the optical function of the LCD can be ensured if the polarizing plate of the LCD is located far from the liquid crystal plate to some extent.

To achieve the object mentioned above, according to the present invention, there is provided a seal apparatus for a finder including a finder body which defines an optical path of the finder and having an entrance opening and an emission opening; a liquid crystal display (LCD) which is located along the optical path of the finder body; and, a polarizing plate which constitutes the liquid crystal display secured to at least one of the entrance opening or the emission opening of the finder body to close the finder body.

According to another aspect of the present invention, there is provided a seal apparatus for a finder having an objective lens group, a roof mirror, a condenser lens, a liquid crystal display, a pentagonal prism, and an eyepiece. The roof mirror, the condenser lens, the liquid crystal display, the pentagonal prism, and the eyepiece are accommodated within a finder body the liquid crystal display is provided with a liquid crystal body and a plurality of polarizing plates, one of which is located far from an image forming surface on which an object image is formed by the objective lens group to close the optical path within the finder body.

According to still another aspect of the present invention, in a liquid crystal display which is provided with a liquid crystal body and a pair of polarizing plates on opposed sides of the liquid crystal body, one of the polarizing plates is located far (or spaced) from the liquid crystal body and secured to an entrance opening of the finder body to close the same.

The present disclosure relates to subject matter contained in Japanese Utility Model Application No. 06-192 (filed on Jan. 25, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
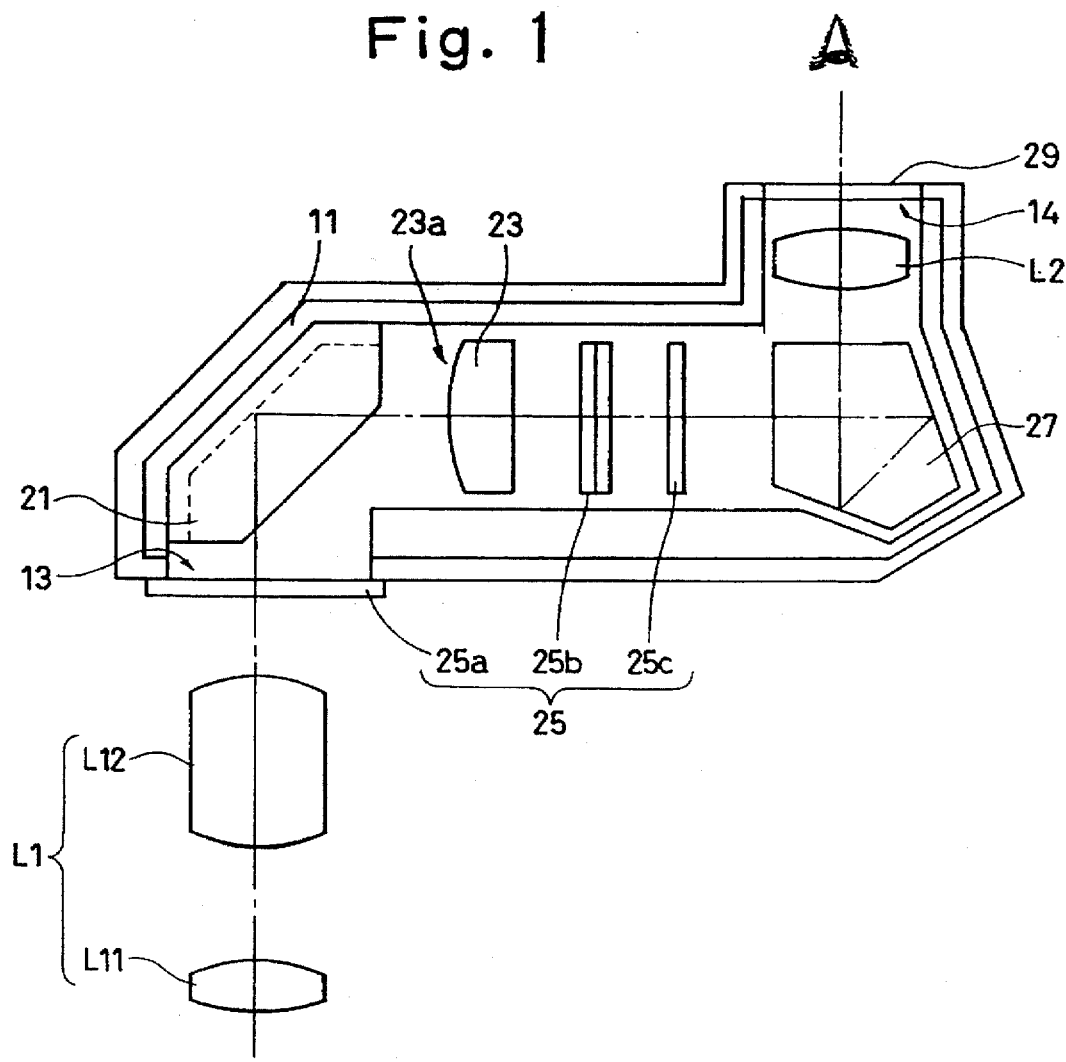
FIG. 1 is a sectional plan view of a real image type zoom finder with a removed cover, taken along the optical axis thereof, according to the present invention; and, FIG. 2 is a front elevational view of the real image type zoom finder shown in FIG. 1, without an objective lens group.
Figure 2:
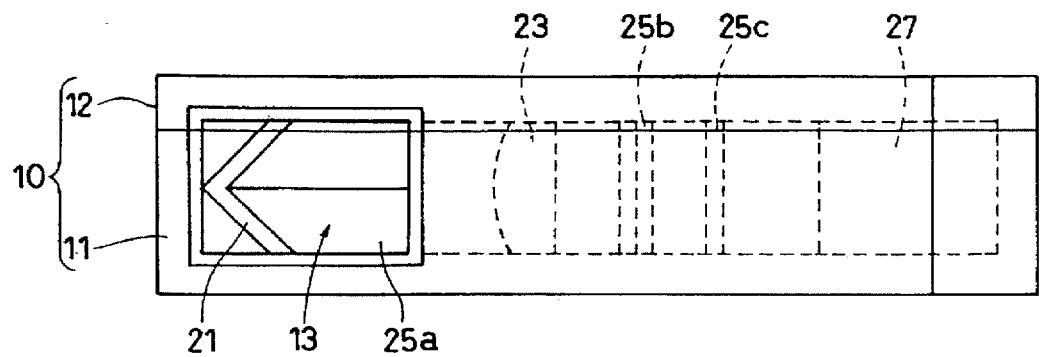

FIGS. 1 and 2 show a real image type zoom finder to which the present invention is applied. The real image type zoom finder can be incorporated, for example, in a lens shutter type camera.

The zoom finder shown in FIGS. 1 and 2 is comprised of an objective lens group L1 (lenses L11 and L12) having a zooming function, a roof mirror 21, a condenser lens 23, a liquid crystal display (LCD) 25, a pentagonal prism 27, and an ocular lens (eyepiece) L2. Among these optical elements, the roof mirror 21, the condenser lens 23, the LCD 25, the pentagonal prism 27, and the ocular lens (eyepiece) L2 are accommodated in a finder body 10.

The first lens group L12 of the objective lens group L1 is supported by a driving mechanism (not shown) so as to move in the optical axis direction in association with the zooming operation of a photographing lens to thereby provide the zooming. Alternatively, it is possible to mount the objective lens group L1 to the finder body 10. The present invention can be applied to both a zoom finder and a finder having a fixed focus.

The finder body 10, includes a housing 11 and a cover (lid) 12 which is separated from the housing 11 along the optical path of the finder. The housing 11 is generally U-shape in cross section, having an upper opening end. The upper opening end is closed by the cover 12 fitted to the housing 11. The inner surfaces of the housing 11 and the cover 12 define an optical path whose cross sectional shape is rectangular. The housing 11 and the cover 12 are usually made of synthetic resin and are preferably black in color so as to exhibit a low reflectance.

The finder body 10 which includes the housing 11 and the cover 12 has an entrance opening 13 and an emission opening 14. The emission opening 14 of the finder body 10 is covered by a glass cover 29 secured thereto to seal the emission opening 14 and protect the eyepiece L2.

As is well known, the LCD 25 which includes a liquid crystal plate 25b having a large number of liquid crystal elements in a matrix arrangement and two polarizing plates 25a and 25c provided in a front and rear of the LCD plate 25b, respectively. The LCD 25 indicates various information, such as shutter speed, diaphragm value, exposure mode, strobe data, drive data, a focus frame that represents a focusing range, a photometering frame that represents a photometering range, or a photographing frame that represents a picture plane size, such as a panoramic size or a standard size, or a close-up picture plane size, etc.

According to one of the most significant features of the present invention, the entrance opening 13 of the finder body 10 is closed and sealed by the polarizing plate 25a of the LCD 25. As noted above, the emission opening 14 of the finder body 10 is closed by the glass cover 29. Although the optical path of the finder is closed or sealed at the (optical) front and rear ends of the finder body 10, it is possible to close the finder body at intermediate portions thereof within the finder body 10.

In the real image type zoom finder as constructed above, an object image is viewed as follows.

A P-polarized light component or S-polarized light component of of rays transmitted through the objective lens group L1 is transmitted through the first polarizing plate 25a and enters the finder body 10. Thereafter, the light rays (object image) entering the finder body 10 are reflected at approximately right angles in a direction (horizontal direction in FIG. 1) perpendicular to the entrance direction by a pair of roof surfaces 21a of the roof mirror 21, and are gathered by the condenser lens 23. Thereafter, the light rays thus gathered are transmitted through the LCD plate 25b and the second polarizing plate 25c. An object image is formed on or in the vicinity of the LCD plate 25b through the reflection by the roof mirror 21.

The light rays transmitted through the second polarizing plate 25c are reflected twice by the pentagonal prism 27 and pass backward in parallel with the optical axis of the objective lens group L1 within the housing. Thereafter, the outgoing light passes through the eyepiece L2 and the glass cover 29 and are emitted outside of the finder body 10. Thus, a photographer can view the erect object image through the glass cover 29 and the eyepiece L2.

The first polarizing plate 25a is secured by an adhesive to a peripheral edge of the housing 11 and the lid 12 that define the entrance opening 13. It is possible to provide an annular recess on the peripheral edge of the housing 11 and the lid 12, so that the first polarizing plate 25a can be easily fitted in the annular recess at a correct position. The securing means for securing the first polarizing plate 25a to the housing 11 and the lid 12 is not limited to an adhesive. Namely, the first polarizing plate 25a can be secured to the housing 11 and the lid 12 by means of a screw or a snap, etc.

As mentioned above, according to the present invention, since the entrance opening 13 of the finder body 10 is closed by the first polarizing plate 25a of the LCD 25, no additional glass cover for closing the finder body 10 is necessary, thus resulting in fewer components, leading to reduction of the weight of the finder as a whole.

Although the above discussion has addressed a zoom finder in which the optical axis extends within the same plane, the present invention is not limited to the illustrated embodiment and can be applied to a finder having no zooming function. For instance, the two reflecting optical elements consisting of the roof mirror and the pentagonal prism can be replaced with a reflecting prism and a pentagonal mirror in combination. Also, the present invention can be equally applied to a finder in which a Porro-prism and a Porro-mirror or a prism having a reflecting surface equivalent thereto and a mirror are used. In summary, the present invention is generally applicable to a finder having a liquid crystal display with a polarizing plate (or polarizing plates), wherein the polarizing plate is adapted to close an optical path thereof, instead of a conventional seal member, such as a glass cover.

As can be understood from the foregoing, according to the present invention, in a sealed finder in which a liquid crystal display (LCD) is accommodated in a finder housing, one of the polarizing plates of the LCD is located far (or spaced) from the LCD body and secured to the finder housing to close the optical path thereof. Consequently, foreign matter, such as dust can be prevented from entering the finder, without additionally providing a special seal member such as a glass cover to close the optical path. Moreover, according to the present invention, the number of the components constituting the seal mechanism can be reduced and assembly thereof can be easily and inexpensively carried out.

We claim:

1. A seal apparatus for a finder, comprising:

a finder body which defines an optical path of said finder, said finder body having an entrance opening and an emission opening; and a liquid crystal display located along said optical path of said finder body, said liquid crystal display comprising a liquid crystal plate and at least one polarizing plate spaced from and out of contact with said liquid crystal plate;

said at least one polarizing plate spaced from and out of contact with said liquid crystal plate being secured to at least one of said entrance opening and said emission opening of said finder body to close said finder body.

2. A seal apparatus according to claim 1, further comprising two reflecting optical elements which are provided along said optical path of said finder body.

3. A seal apparatus according to claim 2, wherein said liquid crystal plate is provided between said two reflecting optical elements; and wherein said at least one polarizing plate comprises a plurality of polarizing plates, one of said plurality of polarizing plates being secured to said entrance opening of said finder body.

4. A seal apparatus according to claim 3, wherein said two reflecting optical elements of said finder comprise a roof mirror and a pentagonal prism.

5. A seal apparatus according to claim 4, further comprising a glass cover secured to said emission opening of said finder body to close said finder body, said roof mirror, another one of said plurality of polarizing plates, said liquid crystal plate and said pentagonal prism being provided along said optical path of said finder body defined between said one of said plurality of polarizing plates secured to said entrance opening of said finder body and said glass cover secured to said emission opening of said finder body.

6. A seal apparatus according to claim 5, further comprising a condenser lens and an eyepiece provided along said optical path of said finder body defined between said one of said polarizing plates secured to said entrance opening of said finder body and said glass cover secured to said emission opening of said finder body.

7. A seal apparatus according to claim 1, wherein said finder body comprises a housing extending along said optical path and a lid secured to said housing.

8. A seal apparatus for a finder having an objective lens group, a roof mirror, a condenser lens, a liquid crystal display, a pentagonal prism, and an eyepiece, wherein said roof mirror, said condenser lens, said liquid crystal display, said pentagonal prism, and said eyepiece are positioned within a finder body, and wherein said liquid crystal display is provided with a liquid crystal plate and a plurality of polarizing plates, one of said polarizing plates being spaced from and out of contact with said liquid crystal plate and from an image forming surface on which an object image is formed by said objective lens group to close said finder body.

9. A seal apparatus for a finder with a finder body having a liquid crystal display provided with a liquid crystal plate and a pair of polarizing plates on opposite sides of said liquid crystal plate, wherein one of said polarizing plates is spaced from and out of contact with said liquid crystal plate and secured to an entrance opening of said finder body to close said finder body.

* * * * *